J. V. MATHIVET.
Spring Scales.
No. 107,272. Patented Sept. 13, 1870.
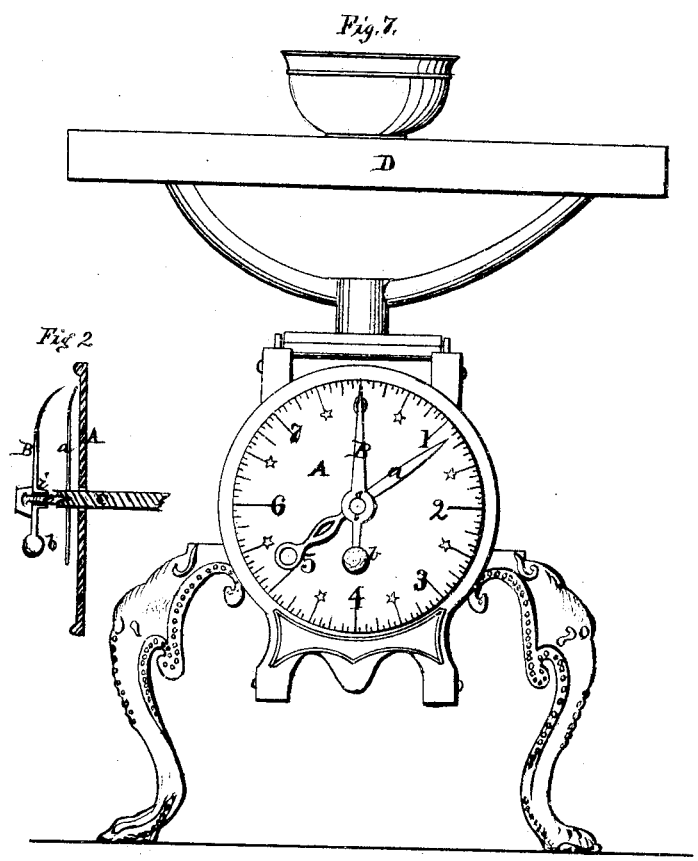

United States Patent Office.

JEAN VICTOR MATHIVET, OF CLEVELAND, OHIO.

Letters Patent No. 107,272, dated September 13, 1870.

IMPROVEMENT IN SPRING WEIGHING-SCALES.

The Schedule referred to in these Letters Patent and making part of the same.

*To all whom it may concern:*

Be it known that I, JEAN VICTOR MATHIVET, of Cleveland, in the county of Cuyahoga and State of Ohio, have invented a new and useful Improvement in Spring-Balance or Scales; and I do hereby declare the following to be a full, clear, and exact description thereof, sufficient to enable those skilled in the art to which my invention appertains to fully understand and to make and use the same, reference being had to the accompanying drawing forming part of this specification.

The nature of this invention relates to an improvement in spring-balances or scales, which indicate weight by an index-pointer, whereby the exact weight of two articles placed on the platform may be indicated at one and the same time.

This improvement consists in the addition of a loose pointer on the same spindle with the fixed pointer, and counterpoised by a weight, so that it shall stand perpendicular and indicating nothing, but which is capable of being fixed at any time so that it shall turn with the spindle and made to indicate the weight of a second article on the scales.

In the drawing—

Figure 1 represents a spring-balance with my improvement attached.

Figure 2 is a section, showing the manner of attaching the aforesaid adjustable second pointer.

A is a dial of the ordinary kind, attached to a spring-balance, which may be of any of the known forms, and which has attached to the spindle *c* a fixed pointer, *a*, which spindle is operated by the spring affected by the weight of the article on the platform D.

The end of the spindle *c* is extended by screwing into it a pin, *e*, which is made slightly tapering, with the largest end next to the spindle.

Fitting on the pin *e* is the sleeve *i* of the loose pointer B, which has a counterpoise weight, *b*.

The object of making the pin *e* tapering is so that, when the sleeve *i* is pushed onto it, the pointer will be fixed, and will turn with the spindle; otherwise, when the sleeve sets loosely on the pin, the pointer B will be caused to stand perpendicular by the counterpoise weight *b*. The pin *e* has a head on it or a small pin through it, to prevent the pointer from slipping off.

A small guard, *h*, is placed on the pointer B over the end of the pin *e*, which may be used as a handle for pushing or drawing the pointer for tightening and loosening it on the pin.

The operation of this improvement is as follows:

For instance, it is desired to ascertain the weight of some article which must be contained in a vessel, such as butter; the dish is placed on the platform of the scale or balance, and the fixed pointer indicates its weight, which may be some fractional weight, but the operator need pay no attention to this; he simply fixes the loose pointer now by touching the guard *h*, pushing the pointer B tightly on the pin *e*, when he may take his dish away, fill it; then by replacing it on the platform the now fixed pointer B indicates the exact weight of the contents, thus obviating the necessity of figuring the difference between the weight of the dish and the aggregate weight of both to find the weight of the contents. It is, therefore, perfectly reliable, being both quick and certain.

The fixed pointer *a* might be dispensed with entirely, as the pointer B can be fixed and used as such in all cases when a single article is to be weighed, and when two are to be weighed, the pointer can be loosened; then, when the dish is on the platform, it may be fixed, and the contents only will then be indicated, it being unnecessary to know the weight of the dish.

Having thus described my invention,

What I desire to secure by Letters Patent, is—

The weighted pointer B *b i*, so constructed and fitted to the spindle *c e* that it may retain its vertical position independent of the spindle, and by a simple adjustment, be made to turn therewith, as and for the purpose described.

JEAN VICTOR MATHIVET.

Witnesses:
GEO. W. TIBBITS,
M. GALLAGHER.